Cyrus A. Maltby. Churn.

No. 104972

Patented Jul 5 1870

Witnesses:
E. Wolff
L. S. Mabie

Inventor:
Cyrus A. Maltby
per Munn & Co.
Attorneys.

United States Patent Office.

CYRUS A. MALTBY, OF ROLAND, ILLINOIS.

Letters Patent No. 104,972, dated July 5, 1870.

IMPROVEMENT IN CHURNS.

The Schedule referred to in these Letters Patent and making part of the same.

To all whom it may concern:

Be it known that I, CYRUS A. MALTBY, of Roland, in the county of White and State of Illinois, have invented a new and useful Improvement in Churns; and I do hereby declare that the following is a full, clear, and exact description thereof, which will enable others skilled in the art to make and use the same, reference being had to the accompanying drawing forming part of this specification.

Similar letters of reference indicate corresponding parts.

My invention has for its object improvement in the construction of churns, and has special reference to the churn-body, hereinafter described; and It consists in the construction and combination of the various parts of the churn, as hereinafter more fully described.

A is the main body of the churn, which is made cylindrical in form, and is provided with ears or handles a', for convenience in handling it.

Figure 1:
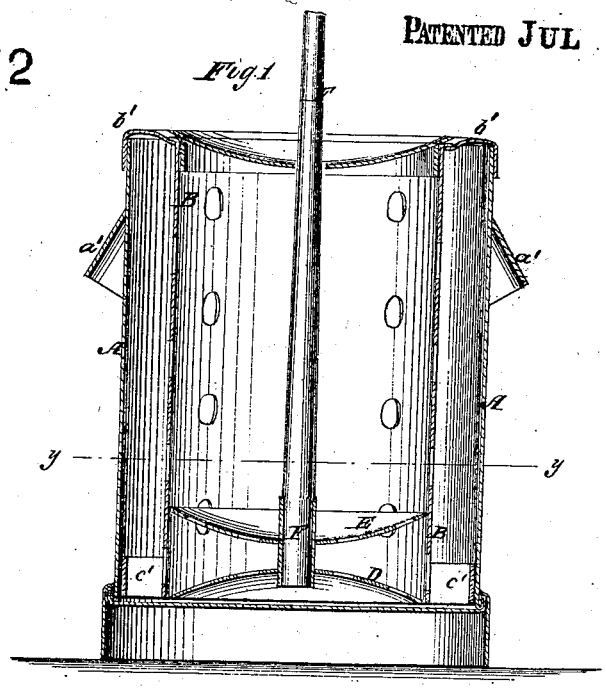
Figure 1 is a vertical longitudinal section of my improved churn, taken through the line X X, fig. 2.
Figure 2:
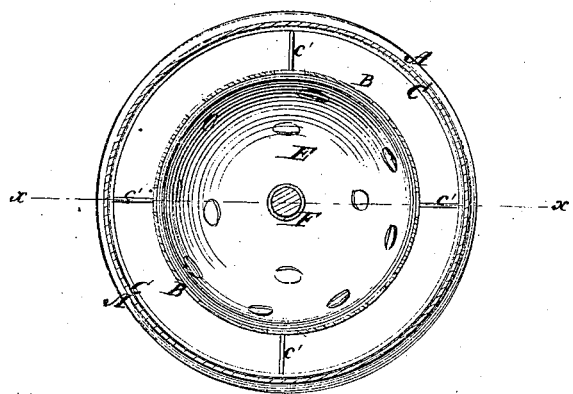
Figure 2 is a horizontal section of the same, taken through the line y y, fig. 1.

B is an inner cylinder, which is made of less diameter than the body A, and is open at both ends, as shown in fig. 1. Around the upper end of the inner cylinder B is formed an outwardly projecting flange, b', the outlet edge of which is bent downward and fits upon the upper end of the body A, as shown in fig. 1.

The lower end of the cylinder B is secured in place by a ring, C, that fits into the interior of the body A, and is connected with the said lower end of the cylinder B by arms C'. The sides of the cylinder B are perforated with numerous holes, to allow the cream to pass freely into and out of the space between the said cylinder B and the body A.

I prefer to use a dasher formed of two concave disks D E, which have holes formed through them, and which are secured a short distance apart, and with their convex sides toward each other, to a short tube into which the lower end of the dasher-handle F enters, and in which it is secured; if desired, the disks D E, may be secured directly to the lower end of the handle F.

The disks D E are made of such a size as to fit into the cylinder B, as shown in the drawing. By this construction, as the dasher is forced downward through the cream, part of the cream is forced up through the holes in the disks D E, and part of the cream is forced, by the downward pressure of the dasher through the holes in the cylinder B, and rising through the space between the cylinder B and body A, it flows through the upper holes in the cylinder B, back into the middle part of the churn, above the dasher D E; as the dasher is raised, part of the cream flows through the holes in the disks D E, into the lower part of the churn, and part is lifted by the dasher, and flowing through the holes in the upper part of the cylinder B it passes down through the space between the said cylinder B and body A, and flows back into the middle part of the churn, below the dasher, through the holes in the lower part of the cylinder B. In this way the cream is thrown into violent agitation, bringing the butter in a very short time. When the churning is completed, the cylinder B may be removed, allowing the butter to be conveniently gathered and removed. The removal of the cylinder B, also allows the entire churn to be easily and conveniently washed.

Having thus described my invention,

I claim as new and desire to secure by Letters Patent—

The perforated cylinder B with its flange b' and stay-ring C, in combination with the cylindrical body A of the churn, substantially as herein shown and described, and for the purpose set forth.

CYRUS A. MALTBY.

Witnesses:
D. L. RILEY,
G. N. PORTER.